United States Patent [19]
Trang et al.

[11] Patent Number: 6,097,575
[45] Date of Patent: Aug. 1, 2000

[54] COMPOSITE SLIDER WITH HOUSING AND INTERLOCKED BODY

[75] Inventors: Howie Trang, San Jose; Jimmy J. Shen, Fremont; Carl J. Carlson, Pleasanton, all of Calif.

[73] Assignee: Read-Rite Corporation, Fremont, Calif.

[21] Appl. No.: 09/115,403

[22] Filed: Jul. 14, 1998

[51] Int. Cl.$^7$ .................................................. G11B 5/60
[52] U.S. Cl. ............................................... 360/234.4
[58] Field of Search ............................. 360/103; 369/13, 369/112, 114; 356/375; 359/223–224

[56] References Cited

U.S. PATENT DOCUMENTS

| | | | |
|---|---|---|---|
| 5,999,303 | 12/1999 | Drake | 359/224 |
| 6,034,938 | 3/2000 | Heanue | 360/114 |

FOREIGN PATENT DOCUMENTS

WO 98/09287  11/1994  WIPO.

Primary Examiner—A. J. Heinz
Attorney, Agent, or Firm—Robert King; Samuel A. Kassatly

[57] ABSTRACT

An optical or magneto-optical (MO) head comprises a head formed of two main parts: a housing and a body. The housing supports optical and magnetic components to be secured to the slider, and the body provides an air bearing surface and further supports the housing. The housing includes a pattern of channels and grooves that retain the optical and magnetic components, and that can be produced with extreme accuracy, so that the cumulative tolerance of the head varies within a very tight range. The components are interlocked within, or secured to the slider in a self-aligned disposition, and do not become detached, even under extremely harsh operating conditions. In addition, the self-alignment feature significantly reduces, if not entirely eliminates the need to align certain components after they have been mounted onto the slider. The slider design enables the head to be mass produced and assembled.

31 Claims, 18 Drawing Sheets

COMPOSITE SLIDER WITH HOUSING AND INTERLOCKED BODY

CROSS-REFERENCE TO RELATED APPLICATIONS

This application relates to U.S. patent application titled "Composite Slider Design", Ser. No. 09/112,174, filed on Jul. 8, 1998, and to U.S. patent application titled "Data Storage System Having and Optical Processing Flying Head", Ser. No. 08/851,379, filed on May 5, 1997.

BACKGROUND OF THE INVENTION

1. Field of the Invention

The present invention relates to the field of data storage systems such as disk drives. The invention particularly relates to a slider design for use in an optical or magneto-optical read-write head for high density recording and reading of information onto and from a storage medium.

2. Description of the Related Art

Data storage systems such as those used with computer systems, typically store data magnetically or magneto-optically onto a storage medium. Data stored on the medium, whether magnetic or optical, is contained in spiral or concentric tracks. An optical data storage system described in U.S. Pat. No. 4,799,210 to Wilson, includes a laser diode assembly mounted on a fixed platform, and an optical head mounted on a movable stage. The laser beam is coupled to the movable head through a flexible optical fiber.

Efforts to reduce the size and weight of optical heads are represented by optical integrated circuits or thin film structures. U.S. Pat. No. 4,911,512 to Yamamoto et al. describes a far-field type optical transducer, and a semi-conductor laser secured on a submount of silicon. A thin film silicon dioxide, $SiO_2$, waveguide element and a glass waveguide layer are also fixed on the submount. A collimator lens, a beam splitter, and a focusing grating are formed on the glass waveguide layer.

Another attempt to achieve compactness and weight reduction of a magneto-optical head is described in U.S. Pat. No. 5,199,090 to Bell. The Bell patent describes a magneto-optic head fabricated on a glass slider and flown adjacent a magneto-optical disk. A transducer is fabricated on one end of the glass slider. A planar or channel waveguide structure, fabricated by ion exchange in the end face of the glass slider, couples light from a light source, such as a laser diode, to the disk for reading or writing.

Optical heads present several design, manufacturing, and operational concerns. One concern relates to the manufacturability of the slider, and particularly to the difficulty of forming the channels, grooves and air bearing surface on various sides of the slider. In addition, each of these channels and grooves has a predetermined tolerance, resulting in a very tight cumulative tolerance of the head.

Another concern is the complexity of handling, assembling, and aligning miniaturized optical and other components relative to each other, to the slider and to the disk storage medium. The assembly process of optical heads is generally complex and time consuming, and might not lend itself to mass production.

Yet another concern is the harsh environment in which these components operate, which might cause some of the components retained by an epoxy layer to become prematurely loose.

Still another concern is the retention of some of these components. For example, when an epoxy layer underlies a component and is disposed intermediate a hard surface and the component, the epoxy layer might not provide a fixed and adequate reference surface, as the component will be "floating" on the epoxy layer. As a result, an unacceptable tilt angle might be imparted to some of these components, which affects the working distance of the components relative to the data storage medium.

SUMMARY OF THE INVENTION

It is an object of the present invention to provide a new optical or magneto-optical (MO) head that can be mass produced and assembled. This goal is achieved by facilitating the manufacturing of the head, and the assembly and alignment of the optical and other components onto a slider. The slider comprises two main components: a housing and a body. The housing supports most, if not all the components to be secured to the slider, and the body provides an air bearing surface and further supports the housing.

The housing includes a pattern of channels and grooves (holes or openings) that define an optical path. These channels and grooves can be produced with extreme accuracy, such that the cumulative tolerance of the head varies within a very tight range.

At least some of the components are interlocked within, or secured to the slider in a self-aligned disposition, so that they do not become detached, even under extremely harsh operating conditions. In addition, the self-alignment feature significantly reduces, if not entirely eliminates the need to align certain components after they have been mounted onto the slider.

The components are secured in position, in direct contact with the hard surface of the slider so that they are not "floating" on the adhesive layer. Consequently, these components can be referenced accurately to one or more sides or surfaces of the slider, with minimal tilt angles.

The head assembly is amenable for automation, and has a relatively short cycle, with a high yield volume production. The assembly is facilitated due to the minimal requirement for aligning the components after they are loaded in their respective compartments (or openings) within or onto the slider. In addition, minimal or no alignment is required for controlling the working distance of the optical assembly. Furthermore, the present head design enables the formation of most, if not all the channels and grooves by means of a single cutting, milling or forming technique.

In addition, the new slider design provides unobstructed paths for the electrical wiring of certain components, such as the micro-actuated mirror and the electro-magnetic coil, in order to ensure the integrity of the wires and service loops.

BRIEF DESCRIPTION OF THE DRAWINGS

The features of the present invention and the manner of attaining them, will become apparent, and the invention will be understood by reference to the following description and the accompanying drawings, wherein.

Similar numerals refer to similar elements in the drawings. It should be understood that the sizes and dimensions of the various components in the figures might not be in exact proportion, and are shown for visual clarity and for the purpose of explanation.

DETAILED DESCRIPTION OF THE PREFERRED EMBODIMENTS

Figure 1:
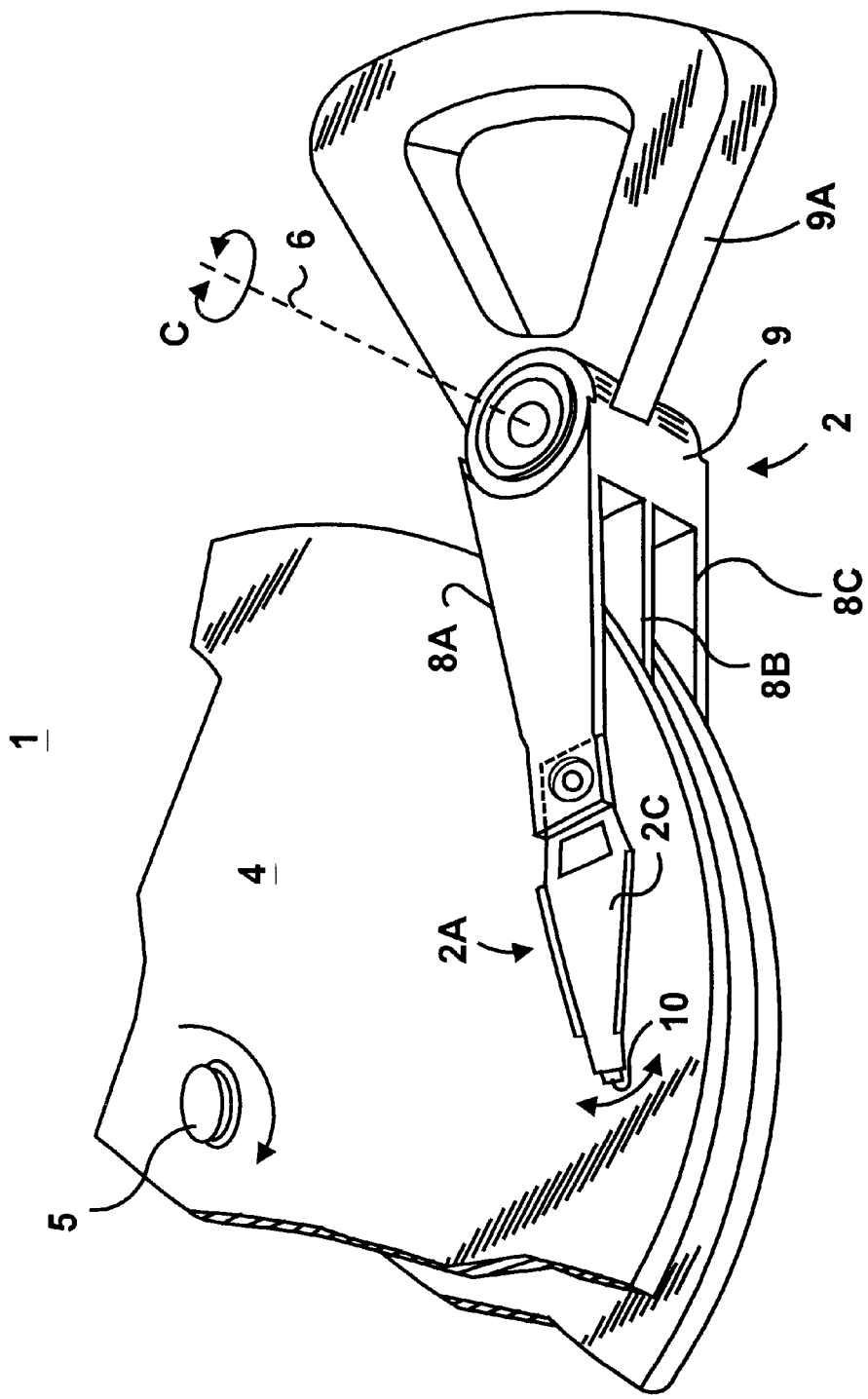
FIG. 1 is a fragmentary, perspective view of a disk drive using a head according to the present invention.

FIG. 1 illustrates a disk drive 1 comprised of a head stack assembly 2 and a stack of spaced apart optical or MO data storage disks or media 4 that are rotatable about a common shaft 5. The head stack assembly 2 is rotatable about an actuator axis 6 in the direction of the arrow C. The head stack assembly 2 includes a number of actuator arms which extend into spacings between the disks 4. Only three of these actuator arms 8A, 8B, 8C are shown for the purpose of illustration. It should be clear that the head stack assembly 2 can include a different number of actuator arms.

The head stack assembly 2 further includes an actuator block 9 and a magnetic rotor 9A attached to the block 9 in a position diametrically opposite to the actuator arms 8A, 8B, 8C. The rotor 9A cooperates with a stator (not shown) for rotating in an arc about the actuator axis 6. Energizing the coil of the rotor 9A with a direct current in one polarity or the reverse polarity causes the head stack assembly 2, including the actuator arms 8A, 8B, 8C, to rotate about the actuator axis 6 in a direction radial to the disks 4.

Figure 2:
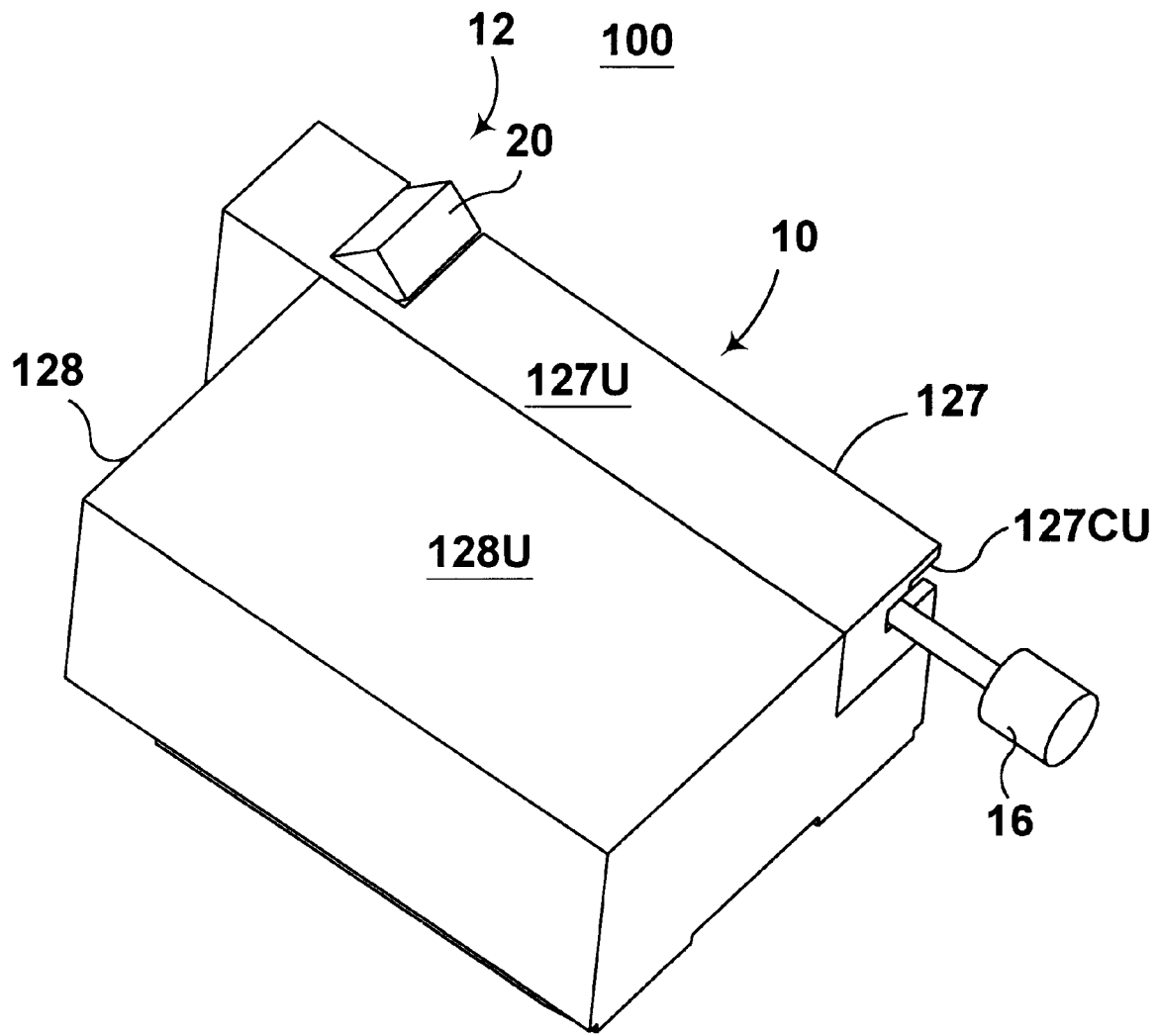
FIG. 2 is an enlarged, top perspective view of an assembled slider forming part of the head of FIG. 1, according to a first embodiment of the present invention, shown housing an optical assembly.
Figure 3:
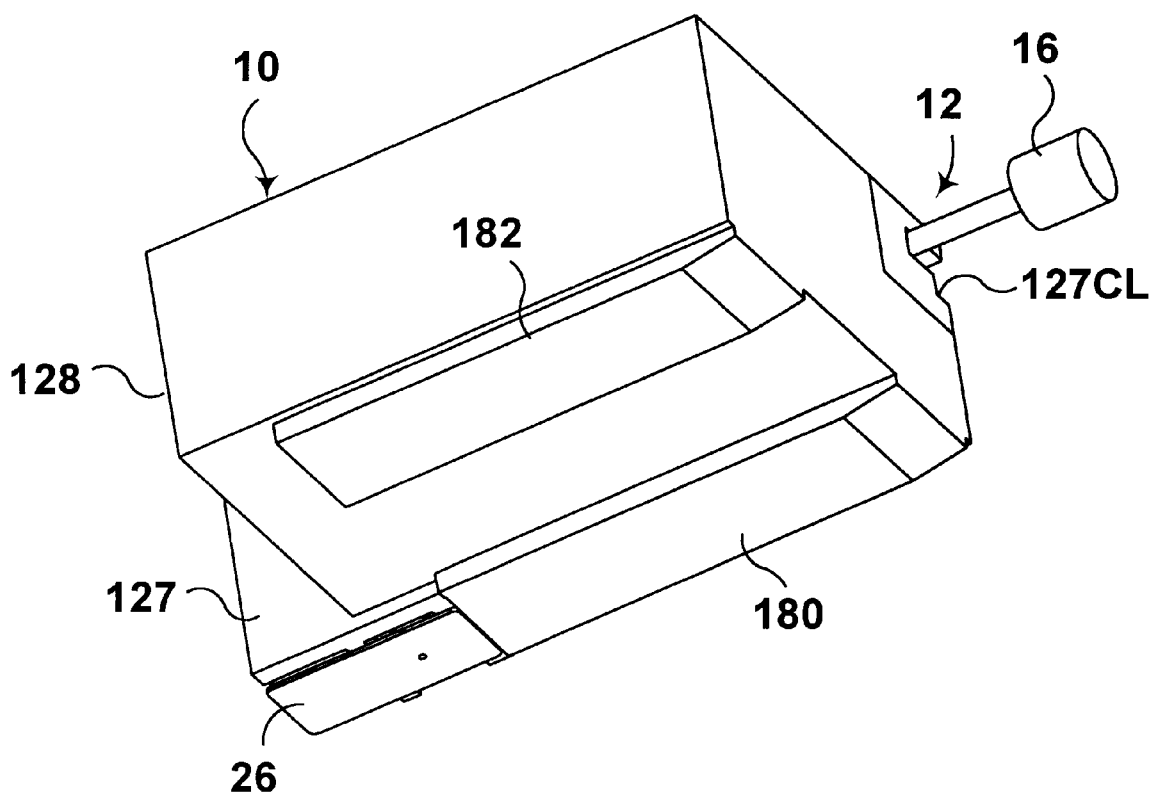
FIG. 3 is a bottom perspective view of the slider of FIG. 2, showing a coil secured to the slider bottom surface.
Figure 4:
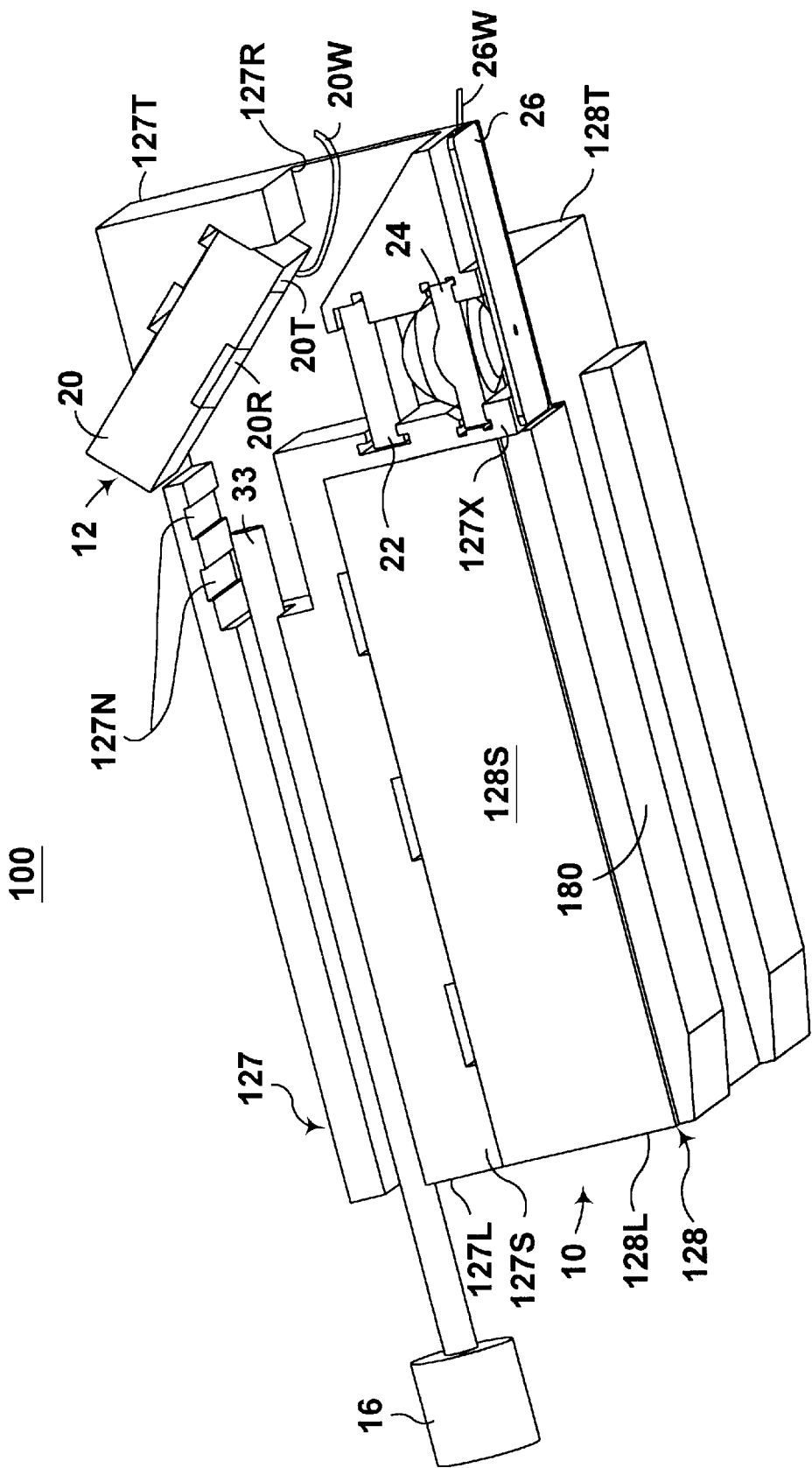
FIG. 4 is an enlarged side perspective view of the slider of FIG. 2, illustrating optical components housed within a slider housing that forms part of the slider of FIG. 2.
Figure 5:
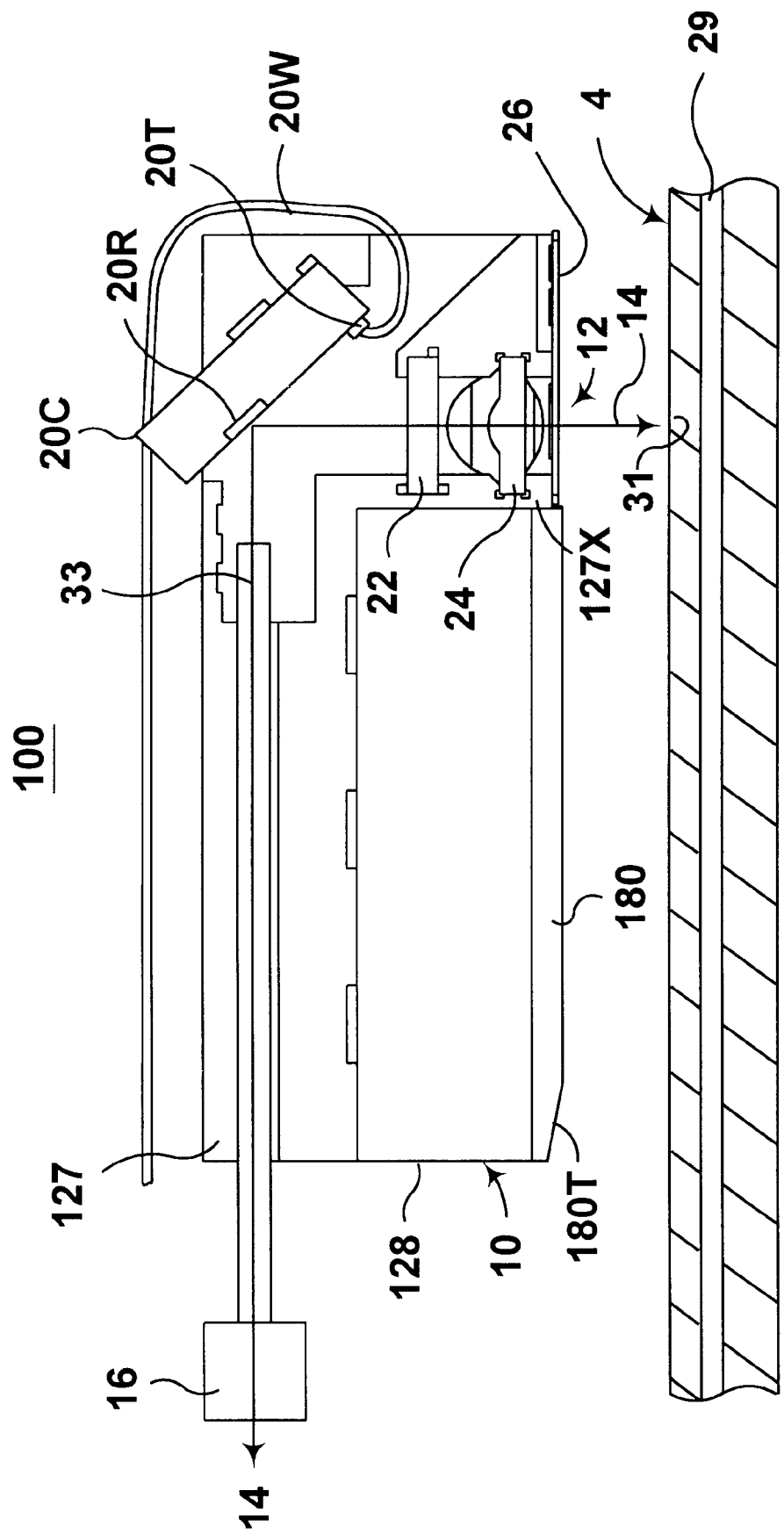
FIG. 5 is a side elevational view of the slider of FIG. 4.

A head gimbal assembly (HGA) 2A is secured to each of the actuator arms, for instance 8A. The HGA 2A comprises a resilient load beam 2C and a slider 10. The slider 10 is secured to the free end of the load beam 2C. The slider 10 retains an optical assembly 12 (FIGS. 2–5) and supports an electro-magnetic coil assembly 26 (FIGS. 3–5). The slider 10, the optical assembly 12 and the coil assembly 26 are cumulatively referred to as a head 100.

The optical assembly 12 directs a read-write optical beam, such as a laser beam 14 (FIG. 5) onto and from a data storage medium such as an optical or a magneto-optical disk 4. According to one embodiment of the present invention, the laser beam 14 is generated by a laser diode or chip (not shown) emitting an optical power sufficient for reading and writing data onto and from the disk 4. In one embodiment, the laser source is selected to operate within a range of 635–685 nm; however, a laser source (or an optical beam) of other frequencies can alternatively be used.

With reference to FIGS. 2–5, the optical assembly 12 includes an optical fiber 16, a mirror (or reflective surface) 20, a quarter-wave plate 22, and a lens 24. The optical fiber 16 guides the laser beam 14 along an optical path defined by the optical assembly 12. While only one optical fiber 16 is shown for the purpose of illustration, it should be clear that additional optical fibers or other light conveying means can alternatively be employed. The laser beam 14 emanating from the optical fiber 16 impinges upon the mirror 20 and is reflected thereby onto and through the quarter-wave plate 22. The laser beam 14 continues its travel along the optical path through the lens 24 and a magnetic coil assembly 26 onto the disk 4.

During the data writing phase, the laser beam 14 is routed by the optical assembly 12 to a magneto-optical recording layer 29 (FIG. 5) within the disk 4. The laser beam 14 lowers the coercivity of the magneto-optical layer 29 by heating a target spot 31 (FIG. 5) to at least the Curie point of the magneto-optical layer 29. Preferably, the optical intensity of the laser beam 14 is held constant, while a time varying vertical bias magnetic field generated by a magnetic coil assembly 26 is used to define a pattern of "up" or "down" magnetic domains perpendicular to the disk 4. This technique is known as magnetic field modulation (MFM). As the selected spot 31 cools, information embodied in the laser beam 14 is encoded on the disk 4.

During the data readout phase, the laser beam 14 (at a lower intensity compared to the laser beam used in the data writing phase) is routed by the optical assembly 12 to the disk 4. At any given target spot of interest 31, upon reflection of the laser beam 14 from the magneto-optical layer 29, the Kerr effect causes the reflected laser beam 14 to have a rotated polarization of either clockwise or counter clockwise sense that depends on the magnetic domain polarity at the target spot 31.

In the present embodiment, the optical path of the laser beam 14 is bi-directional. The reflected laser beam 14 is received through the optical assembly 12 and propagates along the optical fiber 16 to exit at one of its ends for subsequent conversion to an electrical signal. Additional operational details of the optical assembly 12 and the coil assembly 26 can be found, for example, in the following patent applications:

U.S. Ser. No. 08/844,167(U.S. Pat. No. 5,903,525);

U.S. Ser. No. 09/019,225(U.S. Pat. No. 5,886,959);

PCT Publication No. WO 98/09279 corresponding to U.S. Ser. Nos. 60/025,801 and 081844,207;

PCT Publication No. WO 98/09280 corresponding to U.S. Ser. Nos. 60/025,801 and 08/883,320;

PCT Publication No. WO 98/09285 corresponding to U.S. Ser. Nos. 60/025,801 and Ser. No. 08/844,208;

PCT Publication No. WO 98/09286 corresponding to U.S. Ser. Nos. 60/025,801 and Ser. No. 08/745,095(U.S. Pat. No. 5,940,549);

PCT Publication No. WO 98/09287 corresponding to U.S. Ser. Nos. 60/025,801 and Ser. No. 08/851,379(U.S. Pat. No. 6,034,938);

PCT Publication No. WO 98/09288 corresponding to U.S. Ser. Nos. 60/025,801 and Ser. No. 08/798,912;

PCT Publication No. WO 98/09289 corresponding to U.S. Ser. Nos. 60/025,801 and Ser. No. 08/823,422; and PCT Publication No. WO 98/09392 corresponding to U.S. Ser. Nos. 60/025,801 and Ser. No. 08/771,057(U.S. Pat. No. 5,850,375), all of which are incorporated herein by reference.

Figure 7:
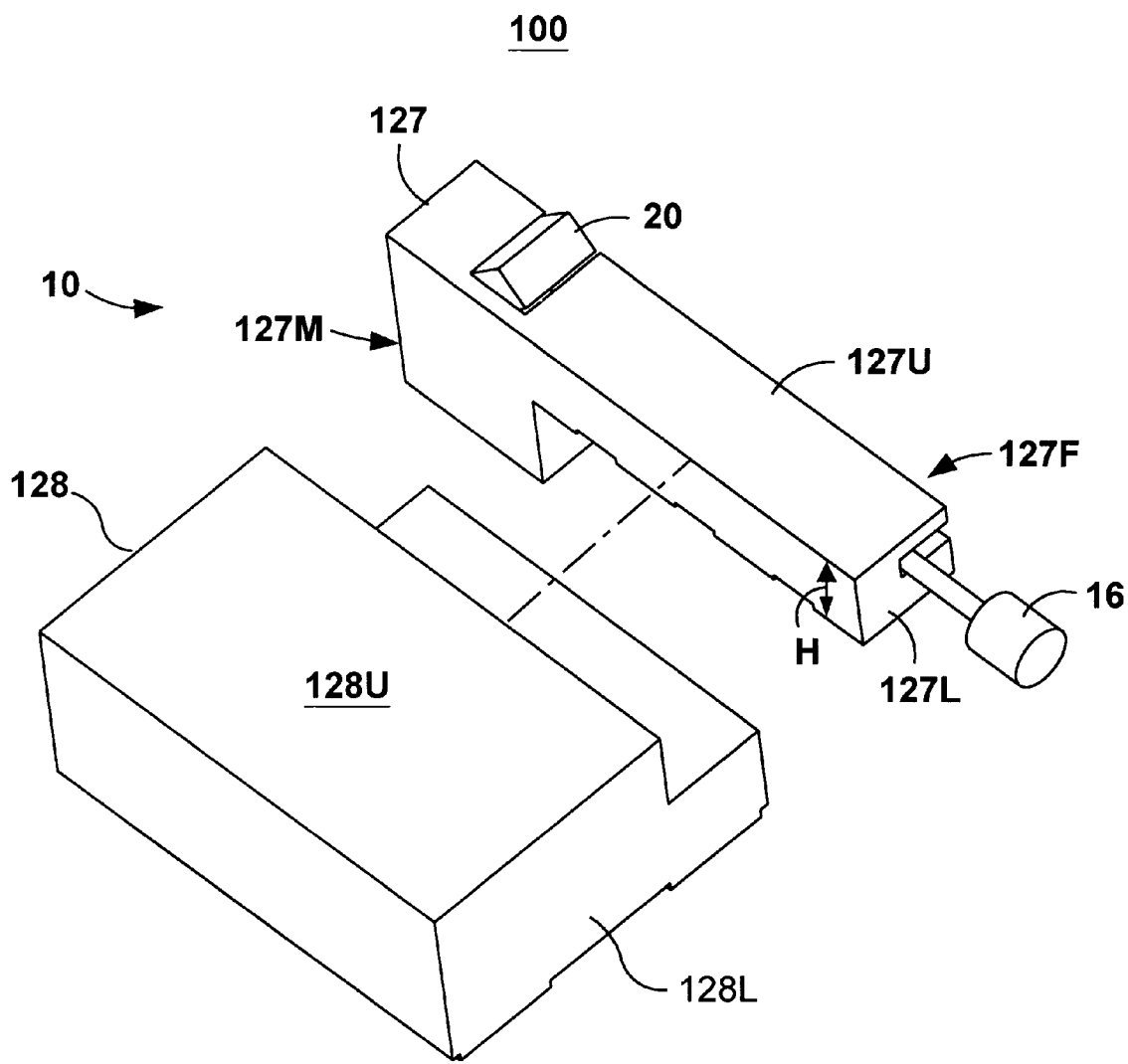
FIG. 7 is a partly exploded view of the slider of FIG. 4, illustrating its two main elements: the housing and a body.

As further illustrated in FIG. 7, the slider 10 is generally formed of two separate components that are secured together to form an integral slider 10. The first component is a slider housing 127 that supports and retains the optical assembly 12 and the coil assembly 26. The second component is a slider body 128 that provides an appropriate air bearing surface to the head 100. The slider 10 is dimensioned to accommodate the physical size and weight of the optical assembly 12, as well as the working distance along the optical path, between a forward end 33 (FIGS. 4, 5) of the optical fiber 16, the mirror 20, the lens 24 and the magneto-optical layer 29 of the disk 4. In addition, the slider body 128 provides accurate references surfaces to the housing 127. The housing 127, in turn, provides accurate reference surfaces to the optical components and the coil assembly 26.

Considering now the slider body 128 in greater detail in connection with FIGS. 2 through 10B, it can be mass produced by available techniques, such as machining or etching a wafer. Alternatively, the slider body 128 can be molded into the desired shape. The slider body 128 can be made of any suitable material such as titanium carbide, silicon, glass, etc. Transparent material facilitates the curing of adhesive used to bond the various components to the slider.

With particular reference to FIGS. 8 through 10B, the slider body 128 is defined by a leading side 128L, a trailing side 128T, a longitudinal side 128S, an upper surface (or side) 128U, a bottom side 128B, and a stepped longitudinal side 128V. The leading side 128L is generally flat and L-shaped. The trailing side 128T is generally flat and parallel to the leading side 128L to facilitate the production of the slider body 128. It should however be clear that the leading side 128L and the trailing side 128T do not necessarily have to be flat or parallel. The upper surface 128U is preferably, but not necessarily flat. The longitudinal side 128S is generally flat and disposed at an angle, typically 90 degrees, relative to the leading side 128L.

The bottom side 128 (FIG. 9A) is defined by the air bearing surface 128ABS and a passageway 128P. The air bearing surface 128ABS includes two side rails 180, 182 that do not necessarily extend along the entire length of the slider body 128. Each of the side rails 180, 182 terminates in a corresponding taper 180T and 182T, respectively. The width of the side rails 180, 182 enables the slider body 128 to provide the required air bearing surface to the slider 10. The passageway 128P extends intermediate the side rails 180T, 182T. Two peripheral grooves 153 can be machined adjacent and parallel to the side rails 180T, 182T, in order to use the machining machine index to accurately control the widths of the two rails 180, 182. In a preferred embodiment the rails 180,182 have equal widths.

Figure 10A:
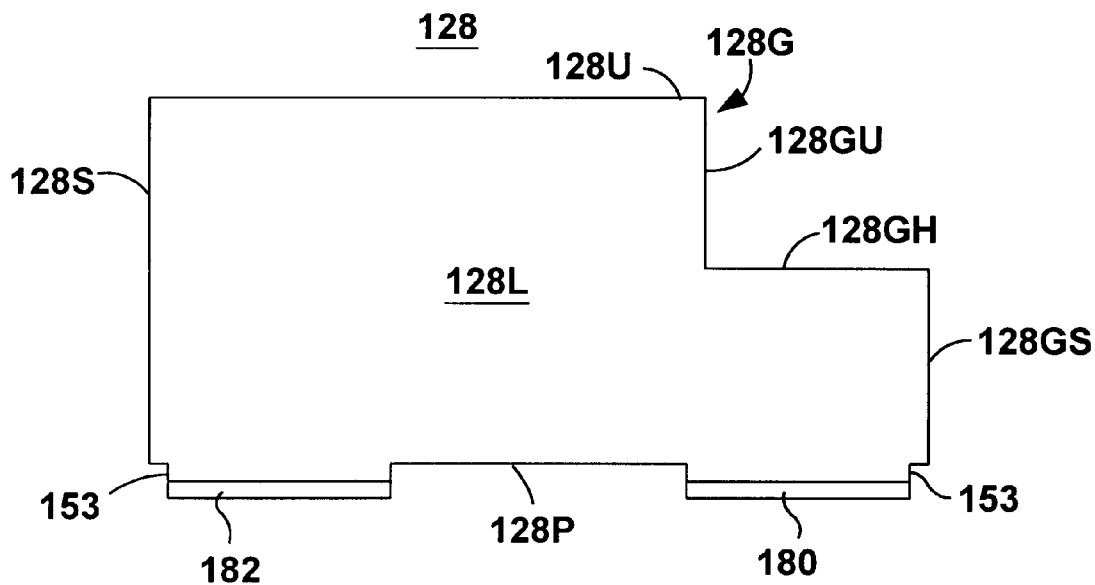
FIG. 10A is a rear elevational view of the slider body of FIG. 8.
Figure 10B:
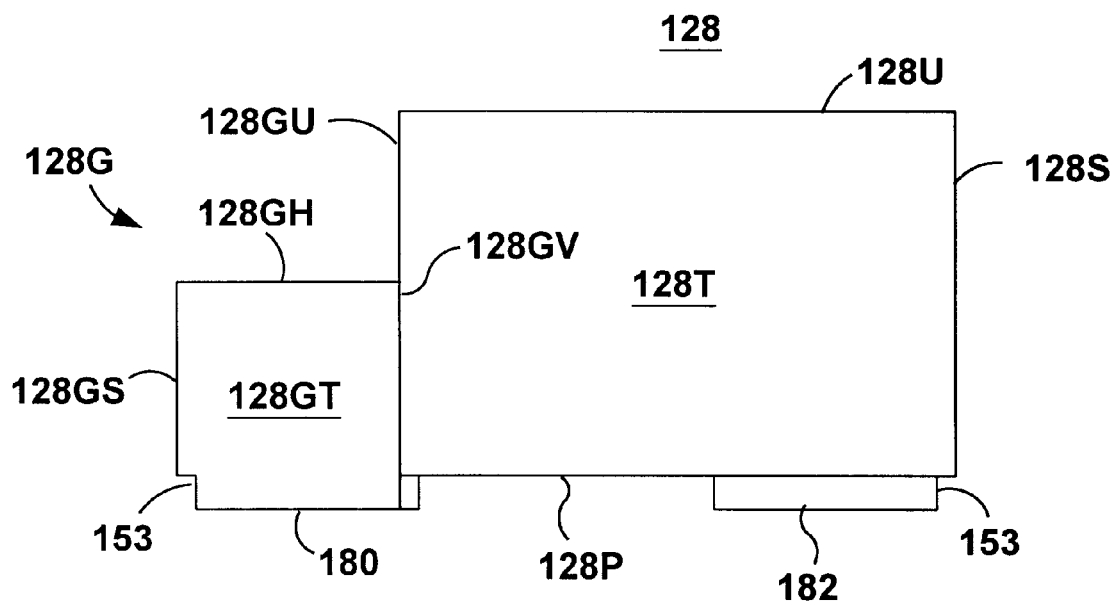
FIG. 10B is a front elevational view of the slider body of FIG. 8.

The stepped longitudinal side 128V is defined by an L-shaped groove 128G (FIGS. 8, 10A, 10B) obtained by machining the side of the slider body 128 to form an upright face 128GU and a horizontal face 128GH, and further by machining the trailing side 128T to form a vertical face 128GV (FIG. 8) and a transverse face 128GT (FIG. 10B). In a preferred embodiment, the upright face 128GU is generally normal to the horizontal face 128GH, and the vertical face 128GV is normal to the transverse face 128GT. The stepped longitudinal side 128V is shaped and dimensioned to receive the housing 127 and the optical assembly 12 therein, with tight accuracy, with the various faces (i.e., 128GU, 128GV, 128GT, and 128 GV) acting as reference surfaces. It should be clear that in other designs, these faces are not necessarily at a 90 degree disposition relative to each other, but can rather be disposed at any suitable angles to provide the required reference surfaces for the housing 127. The stepped longitudinal side 128V is further defined by a longitudinal side 128GS (FIG. 8) that is preferably, but not necessarily flat and parallel to the longitudinal side 128S.

Considering now the slider housing 127 in greater detail in connection with FIGS. 7, and 11 through 14, it can be mass produced by available techniques, such as ion milling, etching, RIE. The slider housing 127 supports and retains the optical assembly 12 and the coil assembly 26 (FIGS. 11, 12), and is mounted on, and secured to the slider body 128 (FIGS. 2, 3, 7). The housing 127 generally includes a fiber section 127F and an upright section 127M that are integrally-formed, and that optically couple optical components, such as the fiber 16, the mirror 12, the quarter wave plate 22, and the lens 24; electrical components if any; and electromagnetic components, such as the coil assembly 26. The housing 127 enables accurate control of the optical spot (31) size (FIG. 5) onto the disk 4; accurate control of the optical working distances relative to the slider 10; and accurate placement and alignment of the optical assembly 12. The housing 127 provides accurate reference surfaces to all the optical components, and enable an unobstructed path for routing the mirror wires 20W and the coil assembly wires 26W (FIGS. 4–6 and 11).

Figure 11:
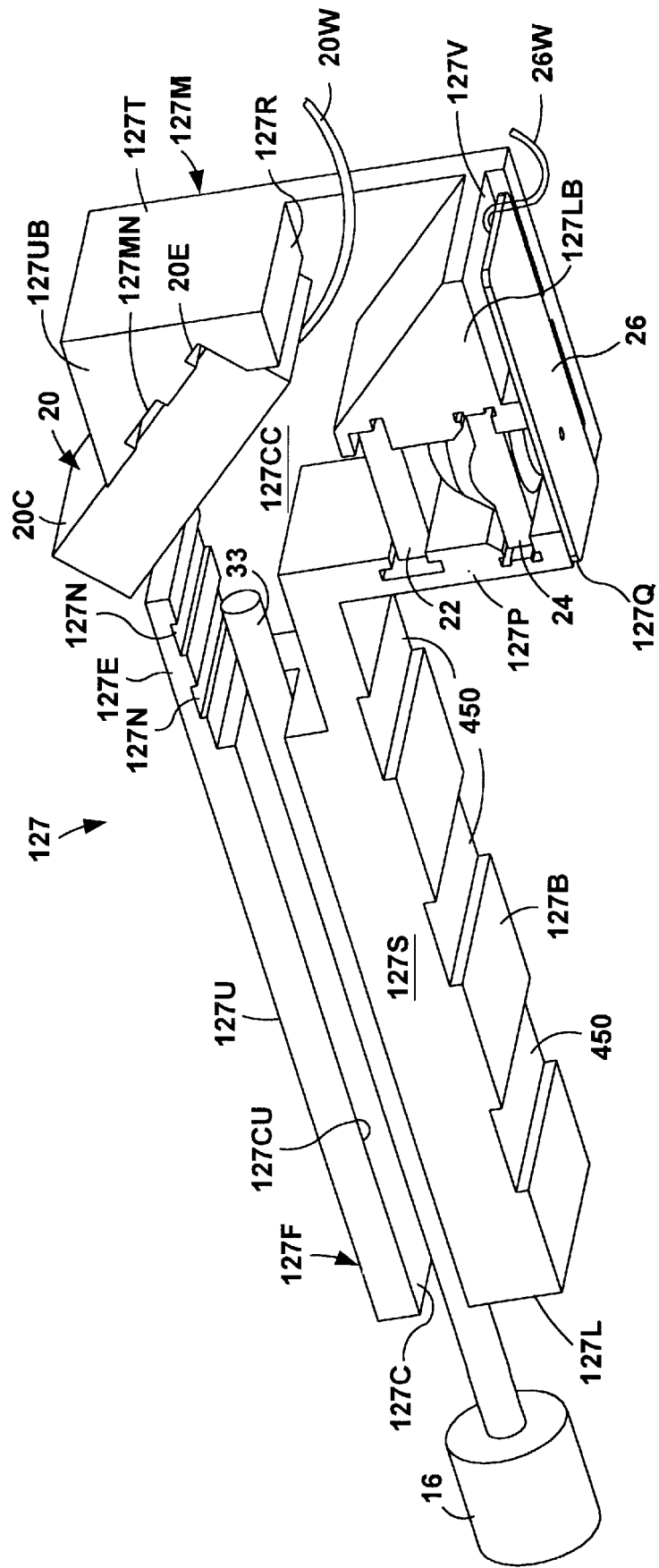
FIG. 11 is a side perspective view of the slider housing of FIGS. 4 and 7.

The fiber section 127F is defined by two longitudinal sides 127S and 127SS, a leading side 127L, a trailing side 127T, an upper surface (or side) 127U, and a bottom side 127B. The fiber section 127F is formed of a generally elongated block with a fiber channel 127C and a chamber 127CC formed therein by available techniques, such as micro-machining. The fiber channel 127C is uniform along its entire length, and is dimensioned to accommodate the optical fiber 16 without the protective jacket. The optical fiber 16 is assembled by inserting it within the fiber channel 127C, with its forward end 33 extending beyond the fiber channel 127C and protruding within the chamber 127CC (FIG. 11). The optical fiber 16 is secured within the fiber channel 127C by means of an adhesive, such as epoxy.

Figure 12:
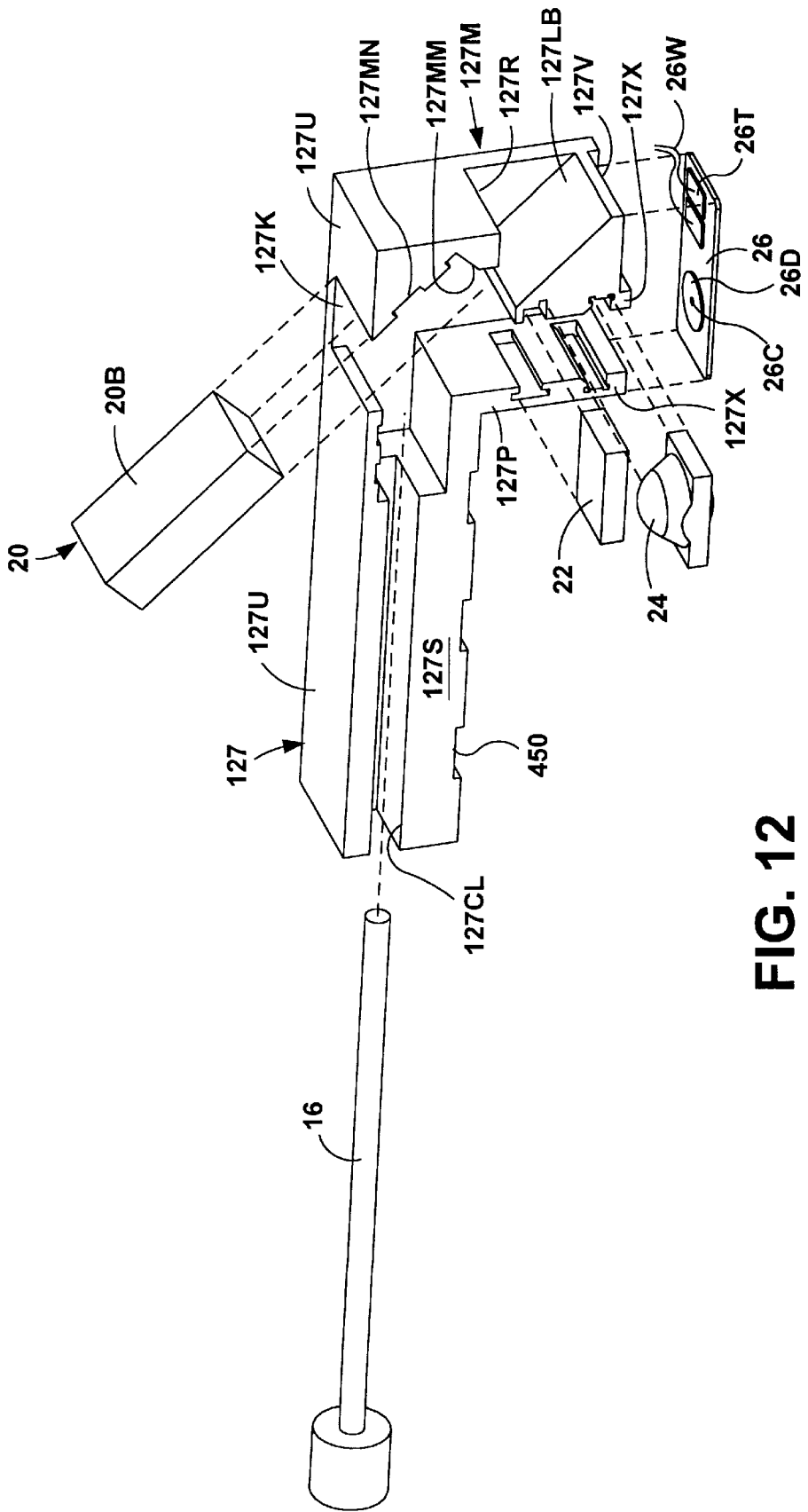
FIG. 12 is another side perspective view of the slider housing of FIG. 11, illustrating the optical components and coil in an exploded view relative to the housing.
Figure 13:
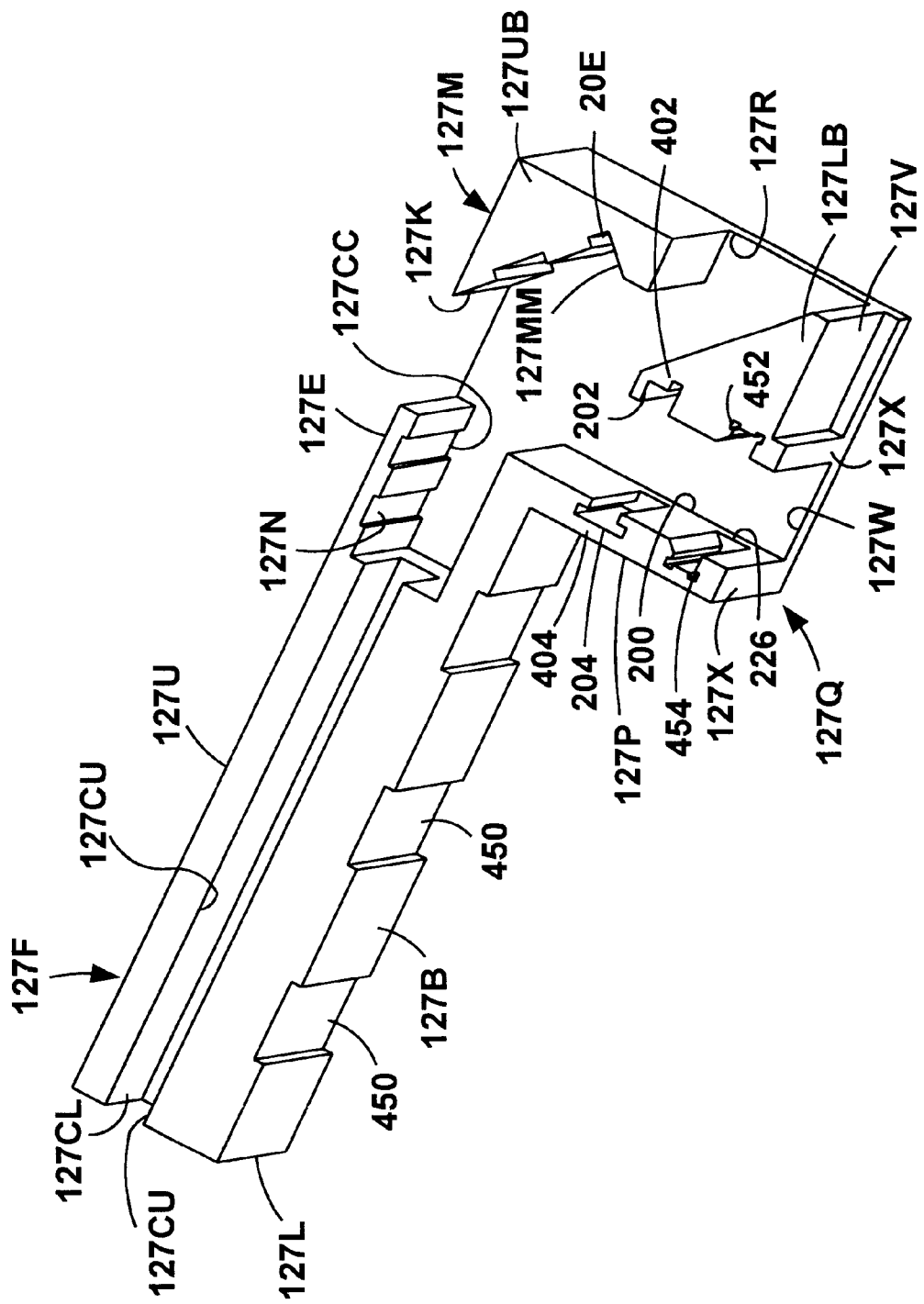
FIG. 13 is another perspective view of the slider housing of FIG. 11, without the optical components and coil.

FIGS. 11 through 14 illustrate the fiber channel 127C as having two flat inner and parallel surfaces 127CL, 127CU (FIGS. 12, 13). FIGS. 2 through 4 illustrate another fiber channel 127C design, wherein the inner surfaces 127CL and 127CU of the fiber channel 127C are stepped for providing a convenient wider entranceway to the fiber channel 127F. In an alternative embodiment, the inner surfaces 127CL and 127CU can be sloped or funnel shaped.

The chamber 127CC is wider and deeper than the fiber channel 127C and accommodates the fiber forward end 33. The chamber 127CC acts as an adhesive relief channel for preventing the epoxy from contaminating the fiber forward end 33 and obstructing the optical path of the laser beam 14. The chamber 127CC serves another purpose, namely to avoid the "clipping" of the divergent optical beam 14 emanating from the fiber forward end 33.

The chamber 127CC is defined by a scaled edge 127E that provides a visual alignment to the forward end 33, in order to position the optical fiber 16 relative to the mirror 20. The edge 127E includes a plurality of notches 127N that are spaced apart and that provide coarse reference points for the alignment of the fiber 16. The fine alignment of the fiber 16 is carried out by measuring the backup coupling of the laser beam 14 reflected from the objective a test instrument (not shown). The back coupling is preferably greater than 50 percent.

The distance between the tip of the fiber 16 and convex surface of the lens 24 is approximately 900 microns with a tolerance of plus or minus 30 microns. According to another embodiment, a laser diode (not shown) can be housed within the chamber 127CC, thus eliminating the need for the optical fiber 16 and the fiber channel 127C.

With reference to FIGS. 11–13, the longitudinal side 127S is generally flat and L-shaped, and extends integrally over the fiber section 127F and the upright section 127M. The longitudinal side 127S includes an opening through which the fiber 16 can be inserted inside the fiber channel 127C, and a plurality of patterned openings through which the optical components, such as the mirror 20, the quarter-wave plate 22, and the lens 24 are inserted inside the upright section 127M.

The longitudinal side 127SS (FIG. 7) is preferably, but not necessarily flat and L-shaped, and extends over both the fiber section 127F and the upright section 127M. The longitudinal side 127SS is parallel to the longitudinal side 127S, and rests against, and is secured to the upright side 128GU (FIG. 8) of the slider body 128, when the housing 127 is seated onto the slider body 128. The height H of the upright face 128GU (FIG. 8) relative to the horizontal face 128GH is approximately equal to the height of the longitudinal side 127SS (FIG. 7), so that the upper surface 127U is preferably flush with the upper surface 128U (FIG. 2) when the slider housing 127 is assembled to the slider body 128. In this particular embodiment of the slider 10, the overall length of the housing 127, that is the distance between the leading side 127L and trailing side 127T, is greater than the overall length of the slider body 128, that is the distance between the leading side 128L and trailing side 128T, so that the housing 127 protrudes beyond the slider body trailing side 128T, when the slider 10 is assembled (FIGS. 2–4).

The upper surface 127U is preferably flat and rectangularly shaped, and extends over both the fiber section 127F and the upright section 127M. The upper surface 127U includes an opening or window 127K (FIG. 12), through which the mirror 20 is loaded into the upright section 127M.

Figure 8:
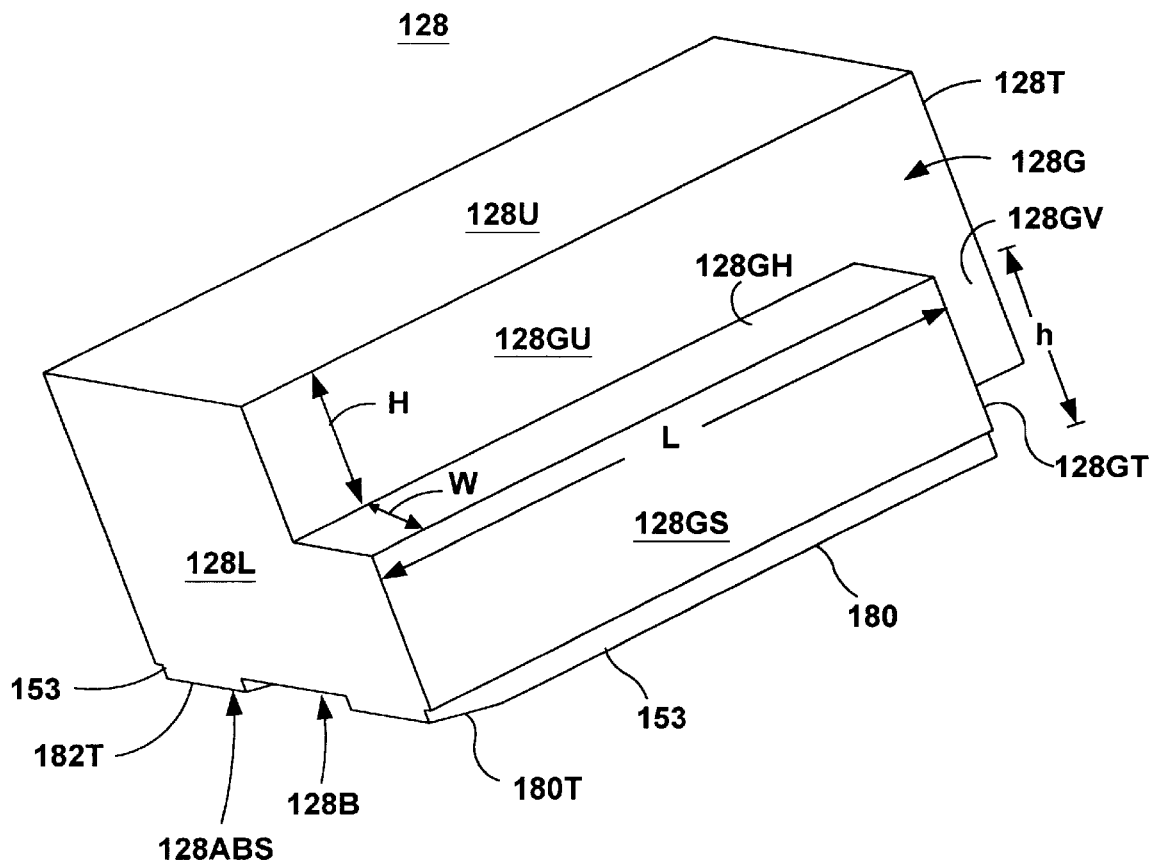
FIG. 8 is a perspective view of the slider body of FIG. 7.
Figure 9A:
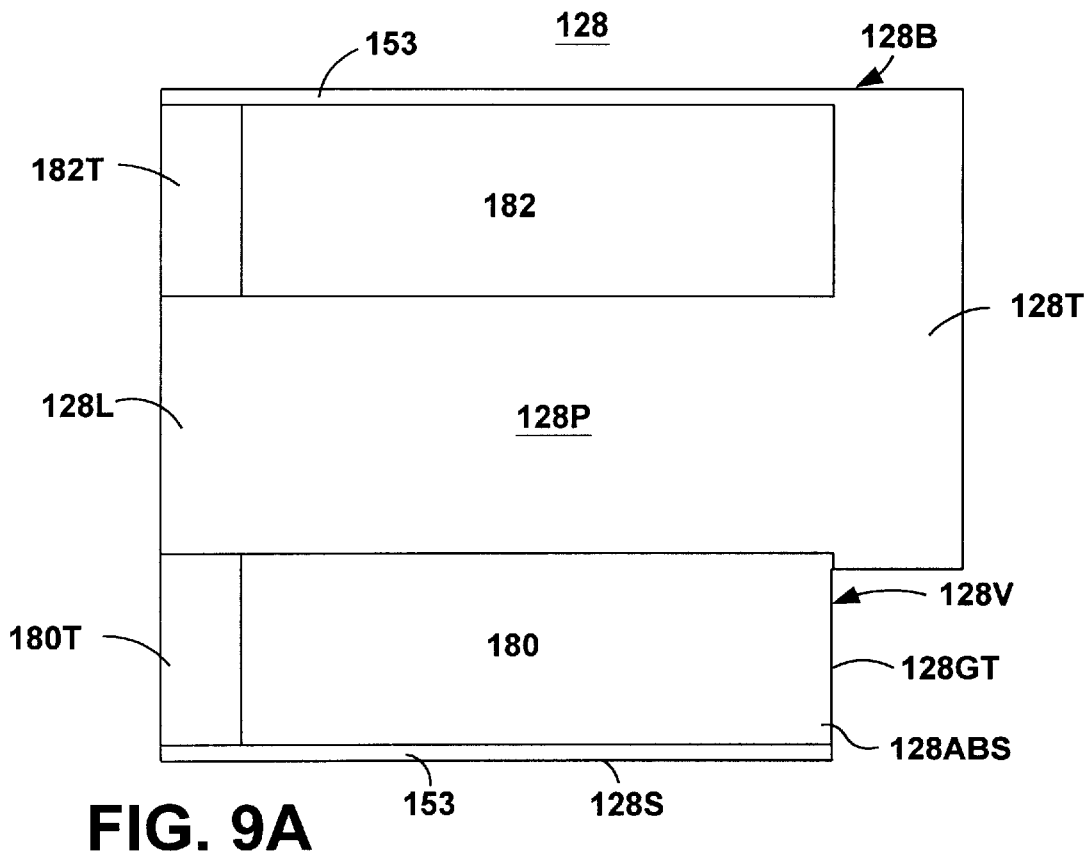
FIG. 9A is a bottom plan view of the slider body of FIG. 8.
Figure 9B:
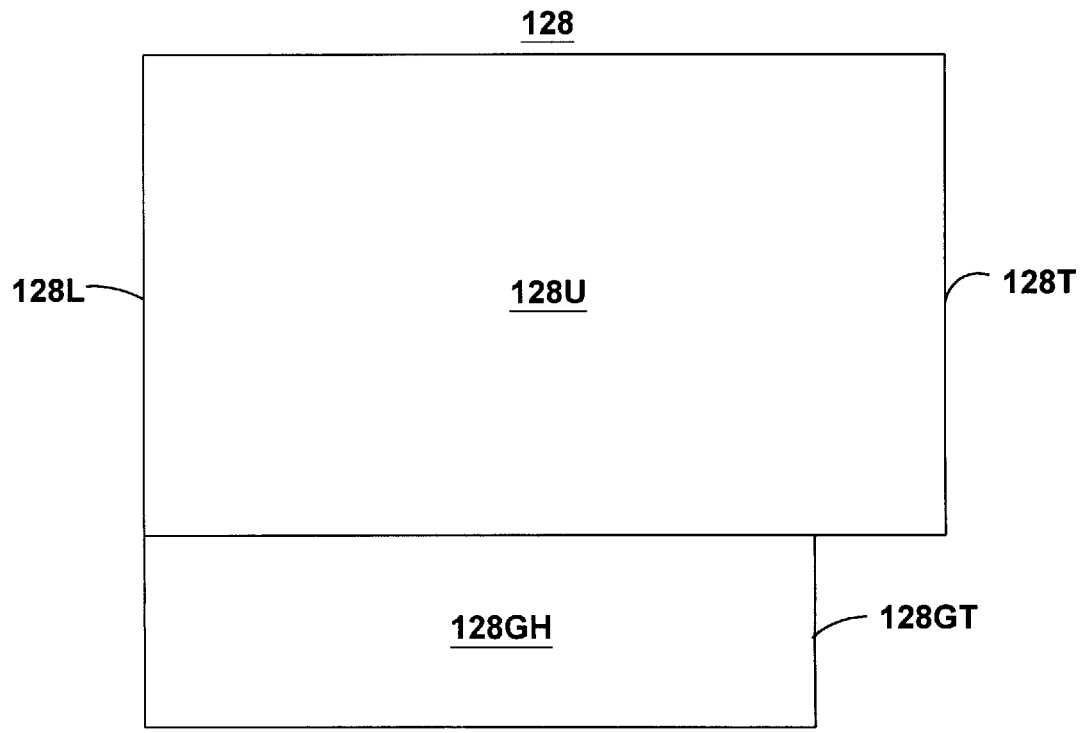
FIG. 9B is a top plan view of the slider body of FIG. 8.

The bottom side 127B (FIGS. 11, 13) is preferably flat and rectangularly shaped, and has its width and length correspond, respectively, to the width W and the length L of the horizontal face 128GH of the slider body 128 (FIG. 8). As a result, the longitudinal side 127S of the housing 127 is flush (or co-planar) with the longitudinal side 128GS of the slider body 128 (FIG. 4), and the leading side 128L of the slider body 128 is flush with the leading side 127L of the housing 127 (FIG. 6), when the slider housing 127 and the slider body 128 are assembled.

Considering now the upright section 127M in greater detail in connection with FIGS. 7, and 11, it provides a channel pattern designed to retain various optical and magnetic (or electro-magnetic) components in optical pre-alignment. While the present embodiment describes these components as comprising the mirror 20, the quarter-wave plate 22, the lens 24, and coil assembly 26, it should be clear that other or different components can alternatively be mounted within or onto the upright section 127M.

The upright section 127M is defined by the two longitudinal sides 127S and 127SS, the trailing side 127T, an inner side 127P, the upper surface 127U, and an underside 127Q. The upright section 127M is an elongated block having various channels or openings formed therein by available techniques, such as micro-machining.

The trailing side 127T is generally rectangularly shaped, and has an opening or window 127R formed therein for routing the mirror wires 20W, and another opening or window 127V for routing the wires 26W of the coil assembly 26. The underside 127Q is generally flat and rectangularly shaped, and includes the opening 127V, and an optical opening 127W (FIG. 13) for allowing the optical beam 14 to pass through the upright section 127M. To this end, the underside 127Q lies in a plane that is parallel to the upper surface 127U, and the optical opening 127W generally coincides with, and is in optical registration with the mirror opening 127K. The optical opening 127W is defined by two parallel edges 127X that support and align the coil assembly 26 (FIG. 13). The window 127V further defines a shelf for applying adhesive.

With further reference to FIGS. 4, 5 and 8, the inner side 127P is substantially normal to the bottom side 127B. The height of the inner side 127P is preferably but not necessarily less than the height h of the transverse face 128GT (FIG. 8). As such, the bottom side 127B (FIG. 11) and the inner side 127P of the housing 127 abut against, and coincide with the horizontal face 128GH (FIGS. 8 and 10B) and the transverse face 128GT (FIG. 10B), respectively, when the slider 10 is assembled. In addition, the edges 127X and the underside of the coil assembly 26 are recessed relative to the rail 180 (FIG. 4) by a distance ranging between 1 $\mu$m and 5 $\mu$m, in order to avoid contact with the medium 4.

With reference to FIGS. 11–14, the upright section 127M includes an upper corner block 127UB and a lower corner block 127LB, which, in conjunction with the inner side 127P, define a pattern of channels and grooves that accommodate the components (for example the optical components) of the head. The upper corner block 127UB includes a 90 degree corner 127MM that seats the mirror 20, when the mirror 20 is loaded into position through the opening 127K. The corner 127MM includes a notch 127MN in which adhesive such as epoxy, is deposited for bonding the backside 20B of the mirror 20 to the upper corner block 127UB, after the mirror 20M is positioned within the housing 127. The corner 127MM provides two reference surfaces for the mirror 20, and orient a reflective surface 20R of the mirror 20 approximately 45 degrees, so that the optical beam 14 (FIG. 5) is reflected at a 90 degree angle relative to the reflective surface 20R.

In this particular embodiment, the fiber section 127F includes a plurality of adhesive grooves or channels 450 formed on the bottom side 427B, in which adhesive is dispensed after the housing 127 is secured to the slider body 128.

Figure 6:
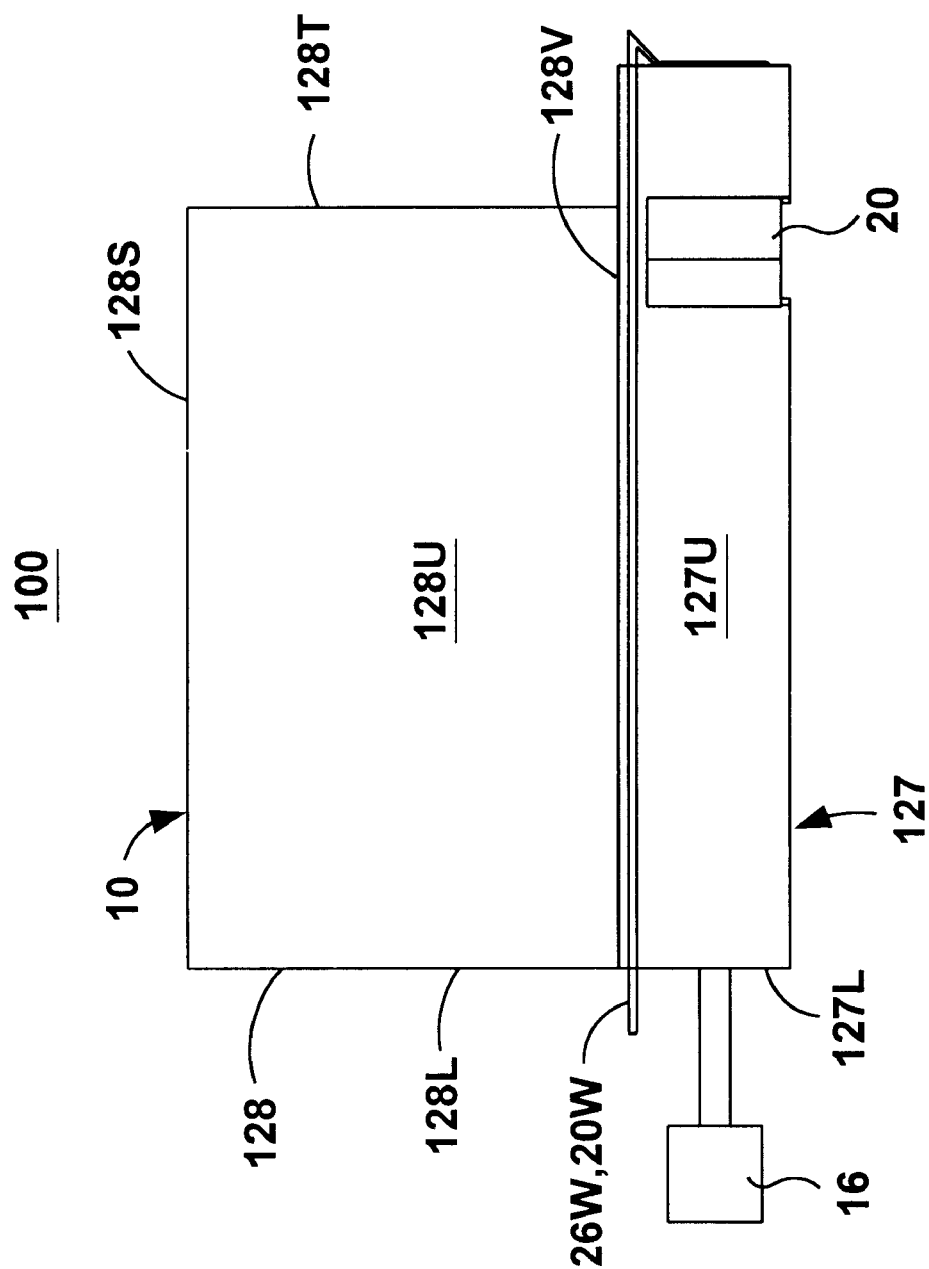
FIG. 6 is a top plan view of the slider of FIG. 4.
Figure 14:
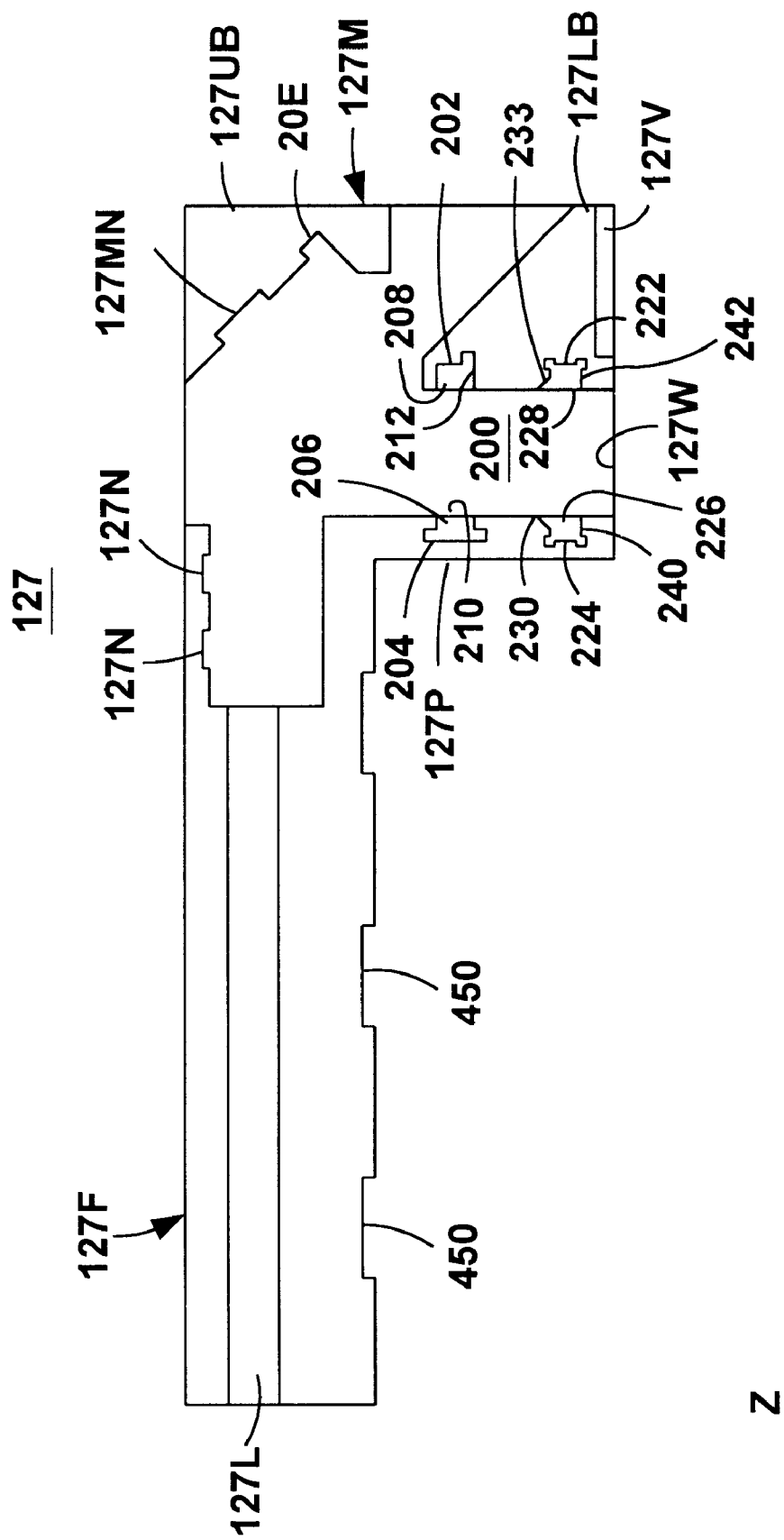
FIG. 14 is a side elevational view of the slider housing of FIG. 13.

The mirror wires 20W are secured to tabs 20T (FIGS. 4, 5) on the front or reflective side of the mirror 20. The wires 20W are freely routed through the opening 127R and looped around the upper corner block 127UB, in close proximity to (or in contact with) the upper surface 127U (and/or the slider body 128U), along the housing 127 (FIGS. 5, 6). As a result, the wires 20W are not compressed by the slider 10, which ensures the integrity of the wires 20W. Furthermore, the wires 20W are routed below the uppermost corner 20C (FIG. 11) of the mirror 20 and do not require added spacing along the Z direction (FIG. 14). Consequently, the wires 20W do not affect or increase the Z-height of the disk drive 1 (FIG. 1) In another embodiment illustrated in FIG. 15, a window 20E is formed in the upper corner block 127UB, and acts as an adhesive channel. The window 29E further enables the fine alignment of the mirror 20 relative to the corner 127MM.

The lower corner block 127LB is disposed opposite the inner side 127P, across from an optical channel 200 (FIG. 13) through which the optical beam 14 passes. The lower corner block 127LB includes an upper notch 202 which is disposed opposite to a symmetrical upper notch 204 formed in the inner side 127P. The notches 202 and 204 do not extend across the entire depth of the upright section 127M, and define two stop edges 206, 208 (FIG. 14) against which the quarter-wave plate 22 abuts when it is inserted within the notches 202, 204. Once the quarter-wave plate 22 is assembled within the upright section 127M, adhesive is dispensed at desired locations to bond the quarter-wave plate 22 in place.

Since the notches 202 and 204 can be micro-machined with extreme accuracy, the quarter-wave plate 22 is self-aligned when it assembled to the housing 127, and no further alignment is required. The self-alignment of the quarter-wave plate 22 is referenced relative to reference surfaces 210 and 212 (FIG. 14). According to another embodiment, the quarter-wave plate 22 can be referenced relative to other surfaces.

The lower corner block 127LB (FIG. 13) further includes an upper notch 222 which is disposed opposite to a symmetrical upper notch 224 formed in the inner side 127P. The notches 222 and 224 do not extend across the entire depth of the upright section 127M, and define two stop edges 226, 228 (FIG. 14) against which the lens 24 abuts when it is inserted (or slid) within the notches 222, 224. Once the lens 24 is assembled within the upright section 127M, adhesive is dispensed at desired locations to bond the lens 24 in place.

In a preferred embodiment, alignment windows 402, 404 are added to the notches 202 and 204, respectively, in order to facilitate the fine alignment and positioning of the quarter-wave plate 22. Alignment windows 452, 454 can also be added to the notches 422 and 424, respectively, in order to facilitate the fine alignment and positioning of the lens 24. It should be clear that in other embodiments, the alignment windows 402, 204, 452 and 454 can be eliminated.

Since the notches 222 and 224 can be micro-machined with extreme accuracy, the lens 24 is self-aligned in the X and Z directions (FIG. 14) when it assembled to the housing 127. The alignment in the Y direction can be done either by translating the lens 24 in the Y-direction, or by controlling the location of the stop edges 226, 228. The self-alignment of the lens 24 for lateral movement or tilt is referenced relative to reference surfaces 230 and 232 (FIG. 14), and for tilting movement, the lens 24 is referenced relative to reference surfaces 240, 242. One advantage of the present design is that the lens 24 does not require alignment for the working distance. According to another embodiment, the lens 24 can be referenced relative to other surfaces.

The coil assembly 26 is secured to, and referenced relative to the edges 127X, with the wires 26W extended through the opening 127V. The coil assembly 26 is aligned relative to the edges 127X and the air bearing surface 128ABS, and by further aligning the laser beam 14 with the center 26C of the coil 26D (FIG. 12).

Figure 15:
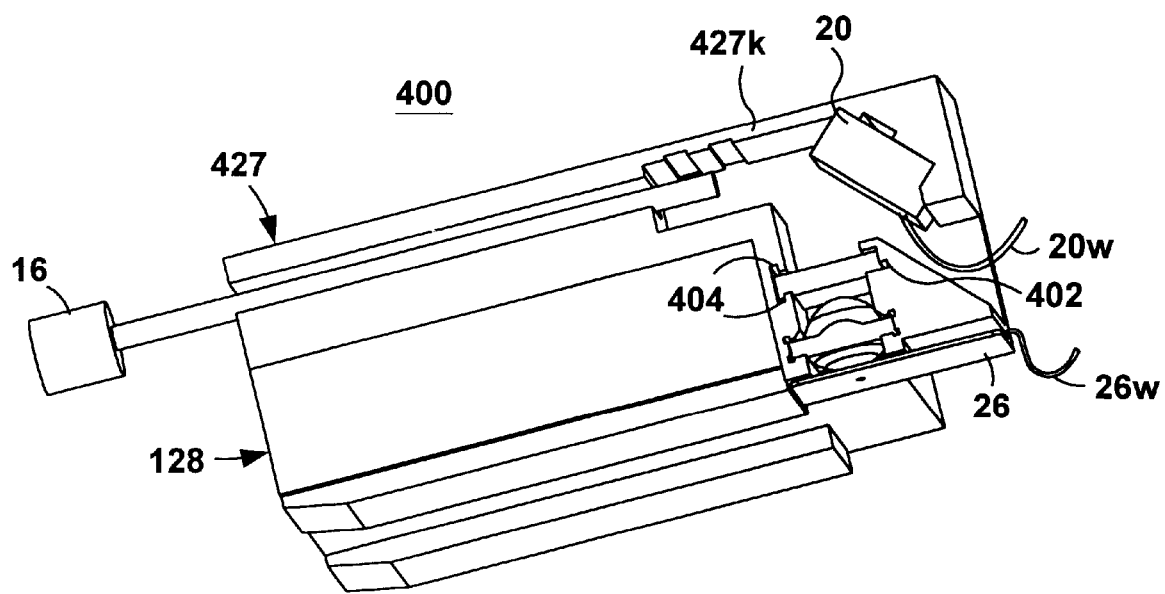
FIG. 15 is a perspective of another slider design according to another embodiment of the present invention.
Figure 16:
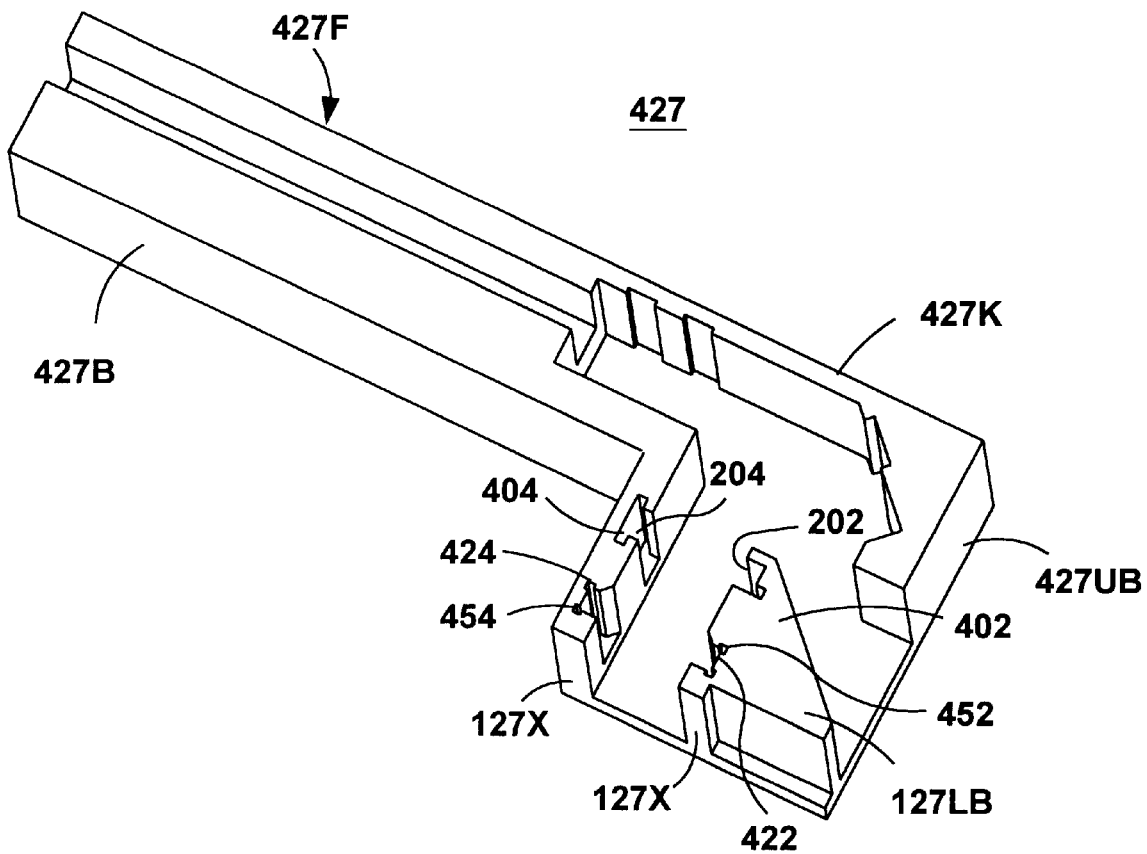
FIG. 16 is a perspective view of the slider housing of FIG. 15, without the optical components and coil.

FIGS. 15 and 16 illustrate another design of a head 400 according to the present invention. The head 400 is general similar to the head 100, and includes the slider body 128, a slider housing 427, the optical assembly 12, and the coil assembly 26. The slider housing 427 is generally similar to the slider housing 127, but it includes certain design modifications.

One such modification is the removal of the adhesive grooves 450 from the bottom surface 427B of the fiber channel 427F. Another modification is the elimination of the alignment window 20E in the upper corner block 427UB. Yet another modification is the elimination of the opening 127K through which the mirror 20 is loaded. In this design, the mirror 20 is completely locked in position within the housing 427 and does not protrude beyond the edge 427K (FIG. 15).

Figure 17A:
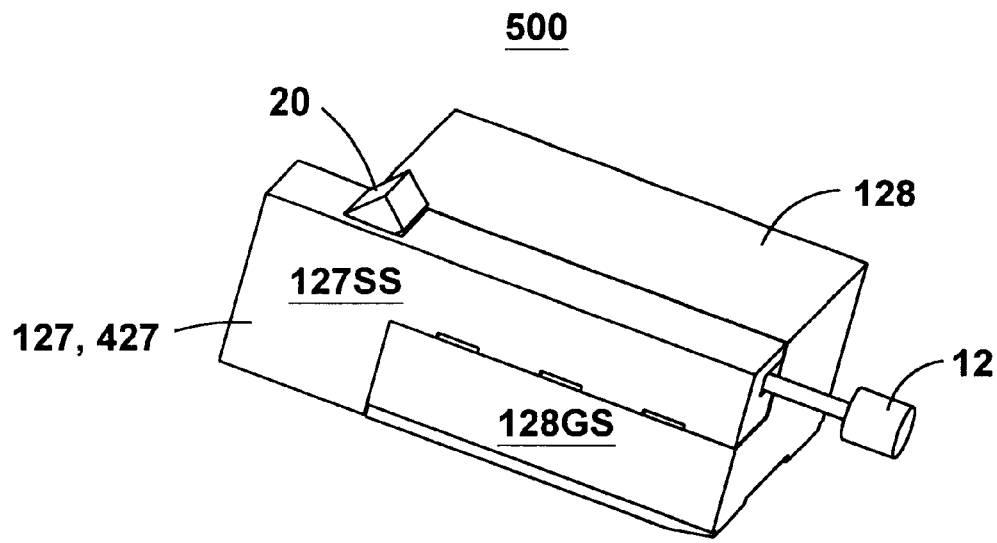
FIG. 17A is a perspective view of another head design shown assembled according to the present invention.
Figure 17B:
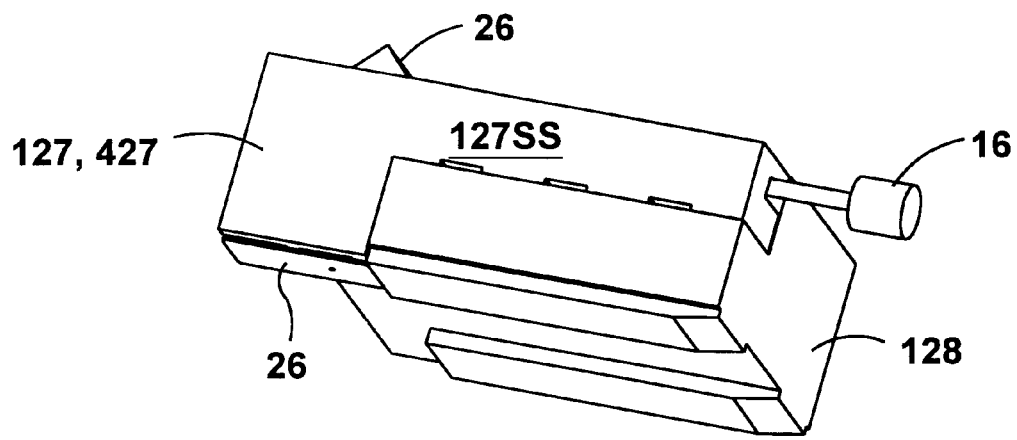
FIG. 17B is another perspective view of the head of FIG. 17A.

FIGS. 17A and 17B are perspective views of another head 500 shown assembled. The head 500 is general similar to the heads 100 and 400, and includes the slider body 128, the slider housing 127 or 427, the optical assembly 12, and the coil assembly 26. While the slider housings 127 and 427 are assembled to the slider body 128 with the longitudinal side 127SS facing and bonded to the slider body 128 (FIG. 7) to enable access to the optical components after assembly, the slider housing 127, 427 of the head 500 is assembled with the longitudinal side 127SS facing outwardly relative to the slider body 128, generally co-planarly relative to the longitudinal side 128GS.

Figure 18:
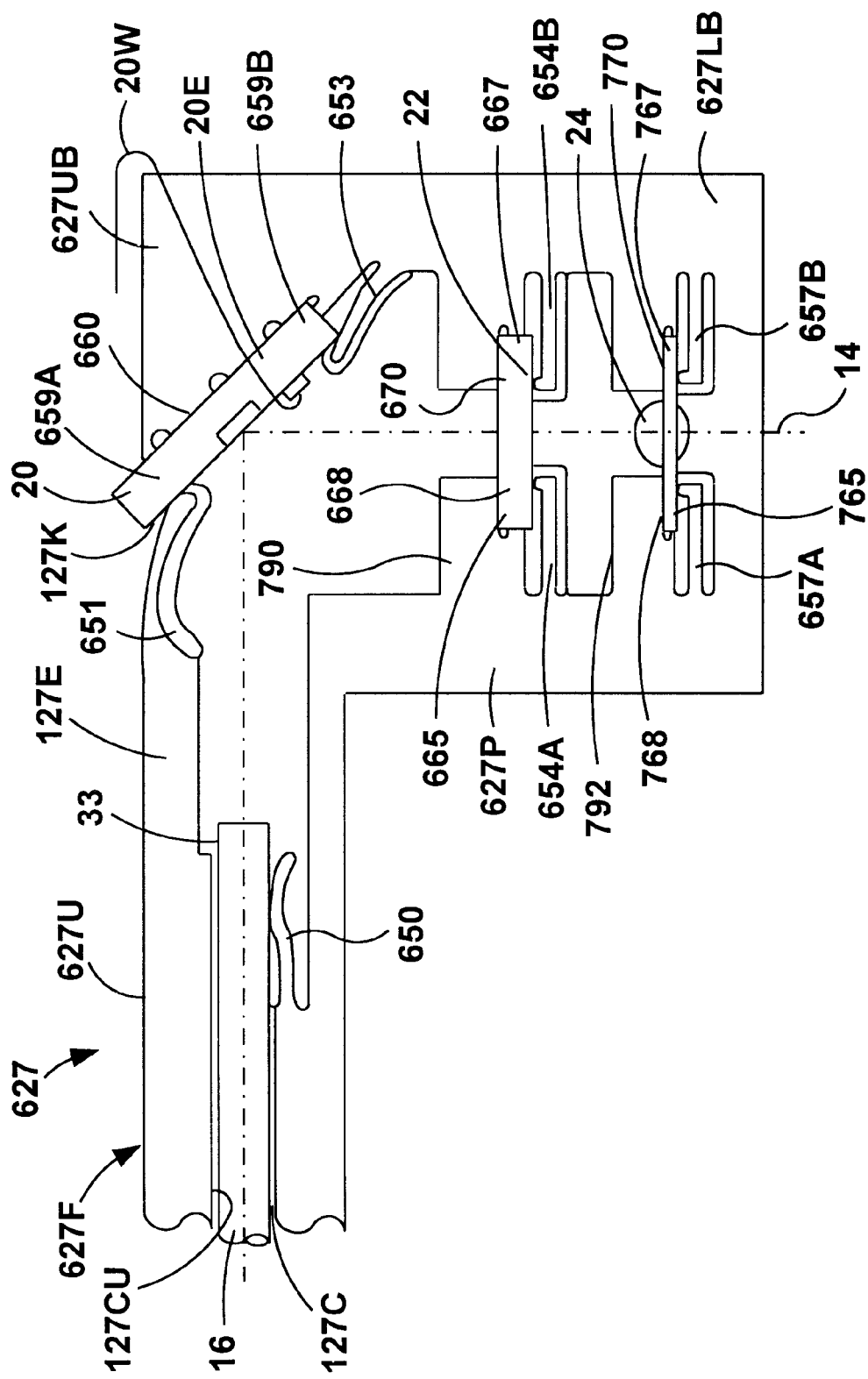
FIG. 18 is a fragmentary, side elevational view of another slider housing design according to yet another embodiment of the present invention.

FIG. 18 illustrates another slider housing 627 according to another embodiment of the present invention. The slider housing 627 is generally similar in function and design to the slider housing 127, and further includes a plurality of springs or compliant members 650, 651, 653, 654A, 654B, 657A, 657B. These compliant members are formed integrally within the slider housing 627 by available techniques, such as silicon micro-machining.

A primary function of the compliant members is to retain the optical and other components firmly in position within the housing 627. In a preferred embodiment, the compliant members 650, 651, 653, 654A, 654B, 657A, 657B are located to direct compressive forces to reference and retain the optical and other components against corresponding reference surfaces or datums.

While in this specific illustration seven compliant members 650, 651, 653, 654A, 654B, 657A, 657B are shown, it should be clear that a different number of compliant members can be selected, as appropriate for specific head designs. One compliant member 650 retains the fiber forward end 33 within the fiber channel 127C, against, and with reference to the inner surface 127CU.

Another compliant member 651 extends from the edge 127E, within the window 127K to retain one end 659A of the mirror 20 against a flat surface 660 of the upper corner block 627UB. The surface 660 acts as a reference surface for the mirror 20. A compliant member 653 extends from one end of the upper corner block 627UB to retain another end 659B of the mirror 20. In a preferred embodiment, the mirror ends 659A and 659B are oppositely disposed, though in other embodiments either or both of the compliant members 651, 653, or additional compliant members can be positioned to abut against other (preferably non-reflective) sections of the mirror 20.

A compliant member 654A extends from the inner side 627P and retains one end 665 of the quarter-wave plate 22 against a flat reference edge 668 of the inner side 627P. Similarly, another compliant member 654B extends from the lower corner block 627LB and retains another end 667 of the quarter wave-plate 22 against a flat reference edge 670 of the lower corner block 627LB. In this particular illustration, the reference edges 668 and 670 are preferably co-planar so that the quarter-wave plate 22 is normal to the laser beam 14.

A compliant member 657A extends from the inner side 627P and retains one end 765 of the lens (or lens carrier) 24 against a flat reference edge 768 of the inner side 627P. Similarly, another compliant member 657B extends from the lower corner block 627LB and retains another end 767 of the lens 24 against a flat reference edge 770 of the lower corner block 627LB. In this particular illustration, the reference edges 768 and 770 are preferably co-planar.

While the present embodiment is illustrated as including one or more compliant member for each of the optical component, it should be clear that in another embodiment, some but not all of the optical components are retained by compliant members.

The slider housing 627 shown in FIG. 18 does not include the window 127R for routing the mirror wires 20W. It should however be clear that such a window can be formed and integrated as part of the slider housing 627. In this embodiment, the upper and lower corner blocks 627UB and 627LB, respectively, are integrated and are not separated as shown for example in FIG. 5. The mirror wires 20W are routed from the tabs 20T around an outer edge 20E of the mirror 20 and onto the upper surface 627U of the fiber section 627F.

The inner side 627P is shown to have a modified design relative to the inner side 127P. For example, the inner side 627P includes two additional edges 790, 792 that protrude inwardly. In addition, the slider housing 627 does not include the opening 127V (FIG. 11) for routing the wires 26W of the coil assembly 26. It should be clear the compliant members can be integrated within the design of the slider housing 627. According to another embodiment, the compliant members can be eliminated all together.

It should also be understood that the geometry, compositions, and dimensions of the elements described herein can be modified within the scope of the invention and are not intended to be the exclusive; rather, they can be modified within the scope of the invention. Other modifications can be made when implementing the invention for a particular environment. For example, the opening 127V can be eliminated and the coil assembly 26 be rotated by 90 degrees relative to the embodiment illustrated in FIG. 12.

What is claimed is:

1. A housing forming part of a slider for retaining at least one optical component, the housing comprising:
   a fiber section;
   an upright section integrally formed with said fiber section;
   wherein said fiber section includes a fiber channel that seats part of an optical fiber, and a chamber through which a forward end of said fiber extends; and
   wherein said fiber section is angularly disposed relative to said upright section.

2. A slider comprising:
   a body for providing an air bearing surface;
   a housing secured to said body, for retaining at least one component; and
   said body including a groove in which said housing is seated;
   wherein said slider body is defined by a leading side, a trailing side, a first longitudinal side, a second longitudinal side an upper side, and a bottom side;
   wherein said first longitudinal side includes a pattern of openings for receiving said at least one component;
   wherein said first longitudinal side abuts said slider body, and said second longitudinal side faces outwardly, away from said slider body, when the slider is assembled;
   wherein said at least one compliant member includes:
   a compliant member that retains a fiber forward end;
   at least one compliant member for retaining a mirror;
   at least one compliant member for retaining a quarter-wave plate; and
   at least one compliant member for retaining a lens.

3. A slider comprising:
   a body for providing an air bearing surface;
   a housing secured to said body, for retaining at least one component;
   said body including a groove in which said housing is seated;
   wherein said slider body is defined by a leading side, a trailing side, a first longitudinal side, a second longitudinal side, an upper side, and a bottom side; and
   wherein said second longitudinal side is stepped for seating said housing.

4. A slider according to claim 3, wherein said leading side is generally flat and L-shaped.

5. A slider according to claim 3, wherein said longitudinal side is generally flat and disposed at an angle of approximately 90 degrees, relative to said leading side.

6. A slider according to claim 3, wherein said bottom side is defined by said air bearing surface and a passageway;
   wherein said air bearing surface includes two side rails; and
   wherein said passageway extends intermediate said side rails.

7. A slider according to claim 3, wherein said stepped longitudinal side includes a generally L-shaped groove defined by an upright face, a horizontal face, a vertical face, and a transverse face.

8. A slider comprising:
   a body for providing an air bearing surface;
   a housing secured to said body, for retaining at least one component;
   said body including a groove in which said housing is seated; and
   wherein said housing includes a fiber section and an upright section.

9. A slider according to claim 8, wherein said fiber section and said upright section are integrally formed; and
   wherein said fiber section is defined by first and second longitudinal sides, a leading side, a trailing side, an upper side, and a bottom side.

10. A slider according to claim 9, wherein said at least one component includes any of an optical component, an electrical component, or a magnetic component.

11. A slider according to claim 10, wherein optical component includes a fiber, a mirror, and a quarter wave plate; and
    wherein said magnetic component includes a lens.

12. A slider according to claim 11, wherein said fiber section includes a fiber channel that seats part of an optical fiber, and a chamber through which a forward end of said fiber extends.

13. A slider according to claim 12, wherein said fiber channel includes two flat inner surfaces.

14. A slider according to claim 12, wherein said fiber channel includes at least one inner surface which is stepped, sloped, or funnel shaped for providing a convenient entranceway to said fiber channel.

15. A slider according to claim 12, wherein said chamber is wider than said fiber channel.

16. A slider according to claim 12, wherein said chamber is defined by a scaled edge that provides a visual alignment to said forward end to assist in positioning said optical fiber.

17. A slider according to claim 9, wherein said upright section includes at least one opening which seats and retains said at least one component.

18. A slider according to claim 17, wherein said upright section includes a pattern of openings for seating and retaining said at least one component.

19. A slider according to claim 18, wherein said at least one component is a coil assembly with wires secured thereto; and wherein said upright section further includes a window through which said coil assembly wires pass.

20. A slider according to claim 17, wherein said upright section further including a first window through which a first optical component can be loaded at least in part within said upright section.

21. A slider according to claim 20, wherein said first optical component is a mirror with wires secured thereto; and wherein said upright section further includes a second window through which said mirror wires pass.

22. A slider according to claim 21, wherein said upright section includes an optical opening for allowing an optical beam to pass through.

23. A slider according to claim 22, wherein said optical opening is bordered by two edges that support and align a coil assembly.

24. A slider according to claim 23, wherein said coil assembly includes an underside; and wherein said coil assembly underside is recessed relative to said air bearing surface.

25. A slider according to claim 23, wherein said upright section defines a shelf in which adhesive is applied for bonding said coil assembly to said upright section.

26. A slider according to claim 17, wherein said upright section includes a first corner block, a second corner block, and an inner side that define said pattern of channels for accommodating said at least one component.

27. A slider according to claim 26, wherein said first corner block seats a first component, and provides reference surfaces thereto.

28. A slider according to claim 26, wherein said second corner block and said inner side include openings for seating at least one or more of a quarter-wave plate and a lens.

29. A slider comprising:

a body for providing an air bearing surface;

a housing secured to said body, for retaining at least one component;

said body including a groove in which said housing is seated;

wherein said housing includes a chamber; and wherein said at least one component includes a laser diode seated within said chamber.

30. A slider comprising:

a body for providing an air bearing surface;

a housing secured to said body, for retaining at least one component;

said body including a groove in which said housing is seated; and wherein said slider housing includes a bottom side in which a plurality of adhesive grooves are formed.

31. A slider comprising:

a body for providing an air bearing surface;

a housing secured to said body, for retaining at least one component;

said body including a groove in which said housing is seated; and wherein said housing comprises a longitudinal side that includes a pattern of openings for receiving said at least one component, and faces outwardly, away from said slider body, when the slider is assembled.

* * * * *